United States Patent
Shiga et al.

(10) Patent No.: US 7,084,214 B2
(45) Date of Patent: Aug. 1, 2006

(54) POLYESTER RESIN COMPOSITION FOR PROFILE EXTRUSION MOLDING AND MOLDED ARTICLE COMPRISING THE SAME

(75) Inventors: Kenji Shiga, Otsu (JP); Akira Nishimoto, Otsu (JP); Osamu Iritani, Otsu (JP); Kazunori Komatsu, Osaka (JP); Mitsuo Nishida, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 238 days.

(21) Appl. No.: 10/365,541

(22) Filed: Feb. 13, 2003

(65) Prior Publication Data

US 2004/0010073 A1 Jan. 15, 2004

(30) Foreign Application Priority Data

| Feb. 15, 2002 | (JP) | ............................ P2002-038887 |
| Feb. 15, 2002 | (JP) | ............................ P2002-038888 |
| Dec. 11, 2002 | (JP) | ............................ P2002-359441 |

(51) Int. Cl.
*C08G 63/16* (2006.01)
*C08G 63/66* (2006.01)

(52) U.S. Cl. ..................... 525/438; 525/437; 525/440

(58) Field of Classification Search ................ 525/437, 525/438, 440
See application file for complete search history.

(56) References Cited

U.S. PATENT DOCUMENTS

| 4,165,307 | A | * | 8/1979 | Mizuno et al. ............. 524/452 |
| 4,176,101 | A | | 11/1979 | Grant et al. |
| 4,318,882 | A | * | 3/1982 | Agrawal et al. ............ 264/521 |
| 4,419,485 | A | | 12/1983 | Borman et al. |
| 4,694,049 | A | * | 9/1987 | Morita et al. ................ 525/440 |
| 4,795,771 | A | * | 1/1989 | Yoshihara .................. 524/114 |
| 4,999,388 | A | * | 3/1991 | Okamoto ..................... 523/400 |
| 5,310,799 | A | | 5/1994 | Carson et al. |
| 5,596,049 | A | * | 1/1997 | Gallucci et al. ............ 525/438 |
| 6,100,320 | A | | 8/2000 | Cobb et al. |
| 6,309,719 | B1 | * | 10/2001 | Schiraldi et al. ........... 428/35.7 |
| 6,437,054 | B1 | * | 8/2002 | Chisholm et al. ........... 525/423 |

FOREIGN PATENT DOCUMENTS

| EP | 0273148 | 7/1988 |
| EP | 0323047 | 7/1989 |
| EP | 0531093 | 3/1993 |
| EP | 0 953 583 A2 | 11/1999 |
| EP | 1059335 | 12/2000 |
| GB | 2251540 | 7/1992 |
| JP | 2300235 | 12/1990 |
| JP | 5230352 | 9/1993 |
| JP | 9290451 | 11/1997 |
| JP | 2000297219 | 10/2000 |
| JP | 2001055497 | 2/2001 |
| WO | WO 0077096 | 12/2000 |

OTHER PUBLICATIONS

C. Papadopoulou et al., "Compatibility behavior of blends of poly(ethylene terephthalate) with an amorphous copolyester", *Polymer* vol. 38, No. 3, pp. 631-637, 1997, Great Britain (El Sevier Science Publishers Ltd.)

* cited by examiner

*Primary Examiner*—Jeffrey B. Robertson
(74) *Attorney, Agent, or Firm*—Kenyon & Kenyon LLP

(57) ABSTRACT

A polyester resin composition for profile extrusion molding comprising an amorphous polyester, at least one component selected from the group consisting of a crystalline polyester and a nucleating agent, and optionally a reactive compound; a polyester resin composition for profile extrusion molding comprising a polyester resin, and a reactive compound having a weight average molecular weight of 200 to 500,000; and a profile shape comprising a resin having a reduced viscosity ratio of 1.01 to 3.00, a reduced viscosity ratio being a ratio of a reduced viscosity of a resin after molding to that of a resin before molding. They do not suffer from sagging in the molding process, they improve the shape accuracy at corners and edges of profile shapes from a die to a sizing step and also resistance to whitening on bending in transparent products, and can provide profile shapes having good solvent resistance and detergent resistance.

4 Claims, 1 Drawing Sheet

//POLYESTER RESIN COMPOSITION FOR PROFILE EXTRUSION MOLDING AND MOLDED ARTICLE COMPRISING THE SAME

CROSS REFERENCE TO RELATED APPLICATION

This application is a convention application claiming priority of Japanese Patent Application No. 2002-038887 filed on Feb. 15, 2002, Japanese Patent Application No. 2002-038888 filed on Feb. 15, 2002 and Japanese Patent Application No. 2002-359441 filed on Dec. 11, 2002, and the contents of which are incorporated herein by reference.

FIELD OF THE INVENTION

The present invention relates to a polyester resin composition for profile extrusion molding and profile shapes thereof. In particular, the present invention relates to a polyester resin composition for profile extrusion molding, which does not suffer from sagging during molding, improves shape accuracy at corners and edges of profile shapes from a die to a sizing step, provides profile shapes having improved resistance to whitening on bending in transparent products and sufficient mechanical properties, and increases the solvent resistance and detergent resistance of the profile shapes, and also to profile shapes produced by profile extrusion molding such a polyester resin composition.

BACKGROUND OF THE INVENTION

Hitherto, profile extrusion molding is employed for producing building products such as window frames, gutters, etc. from plastics. Resins to be used in profile extrusion molding should have properties to follow complicated shapes of dies and have good dimensional accuracy. From the viewpoint of those properties and also costs, polyvinyl chloride resins and polyolefin resins are generally used. However, it is difficult to use polyolefin resins particularly in applications requiring adhesion since they usually have less adhesion to various adhesives, and also in applications requiring transparency since they are whitened by crystallization. Thus, vinyl chloride resins are mainly used. But, there is a trend to substitute the vinyl chloride resins with other materials because of various problems arising these years. Among various substitute materials, polyester is a promising material from the viewpoint of its physical properties, environmental friendliness, adhesion properties, costs, etc. However, there are some problems in substituting the vinyl chloride resins used in profile extrusion molding with polyester.

In general, a profile extrusion molding process starts from a kneading and extrusion step and proceeds in the sequence of a profile die step, a sizing step, a cooling step, a cutting step and a fabrication step. When a polyester resin is processed by such steps, it sags in the course from the profile die to the sizing step because of the insufficient melt strength of the resin. Therefore, the molded resin cannot be conveyed to the next step, or cannot maintain its adequate shape.

Here, the maintenance of a shape is explained. Different from usual extrusion molding, the shapes of profile shapes are very complicated and often they have a hollow portion. In addition, in many cases, the profile shapes have sharp corners or edges at open part margins. When a resin having insufficient melt strength is used, a drawback such that the corners or edges are rounded before the resin reaches the sizing step tends to appear.

In general, to avoid such a drawback, a multi-plate sizing system or a vacuum sizing system is used in the sizing step to forcibly fix the shape. With such a system, since the polymer is forcibly deformed while cooling, a residual stress remains in the product so that stress cracking is caused in the product with solvents, solvent vapors or quick change of temperature. To overcome such a problem, the further improvement of melt strength of the resins is required in comparison with resins used in usual extrusion processing.

To solve such a problem, several proposals have been made. For example, a method is proposed for improving the dimensional accuracy of a profile shape by using polyester having a high melt viscosity in a range from a low shear region to a high shear region to avoid the sagging of the resin during molding (for example, JP-A-9-290451). Although this method can improve the sagging of the resin, the molding of the resin becomes difficult at low temperature since the melt viscosity in the high shear region is too high. Thus, such a resin must be molded at high temperature. Therefore, the polyester is severely thermally decomposed, extrusion marks often appear, and weld lines heavily form, so that the color tone, shape, strength, etc. of the profile shapes are worsened. Thus, further improvement of the resins is sought.

Furthermore, another method is proposed for maintaining a melt strength of a polymer by branching the polymer to reduce a viscosity of the polymer in a high shear region of a die and then restoring the viscosity in a shear-free region after extrusion (WO 00/77096). Although this method can improve the melt strength and the sagging of the resin to some extent, the effects are not satisfactory, and thus the further improvement is desired.

In the case of a blow extrusion application, a reactive melt-strength intensifier having a weight average molecular weight of 1,000,000 to 4,000,000 is proposed as a reactive melt-strength improver, and the effect of the intensifier to improve the melt strength is shown (JP-B-3237913). That is, this patent proposes a transparent polyester resin composition by the addition of a melt-strength intensifier having the same refractive index as that of a resin to a transparent amorphous polyester resin. However, an amount of this type of the melt-strength intensifer and processing conditions should be completely adjusted, since a vinyl aromatic modifier having a high molecular weight should be dispersed in the polyester resin. For example, when the melt-strength intensifier is added in an amount necessary for achieving the intended melt strength, the processing conditions are limited in certain narrow ranges. If the processing conditions deviate from such narrow ranges, the melt strength easily changes to induce an insufficient melt strength or an excessive melt strength. Since the compatibility of the melt-strength intensifier and the amorphous polyester is probably low, voids may sometimes be formed by slight bending when a profile shape is fixed, for example, in the processing of the article, so that a part containing the voids is whitened. That is, when the melt-strength intensifier has an excessively large molecular weight, a length of an interface between the intensifier and the amorphous resin increases so that the size of this region increases to a visible region or larger, which is disadvantageous for whitening on bending.

In addition, since the above resin composition has low resistance to chemicals such as solvents, detergents, etc., it is whitened or swelled when it is wiped with the solvents or detergents in the processing step or usual cleaning, so that the appearance of the profile shape is deteriorated.

SUMMARY OF THE INVENTION

The first object of the present invention is to provide a polyester resin composition for profile extrusion molding, which can improve sagging during profile extrusion molding and shape accuracy at corners and edges of profile shapes from a die to a sizing step, provide profile shapes having improved resistance to whitening on bending in transparent products, and increase the solvent resistance and detergent resistance of the profile shapes.

The second object of the present invention is to provide a polyester resin composition for profile extrusion molding, which can improve sagging during profile extrusion molding and shape accuracy at corners and edges of profile shapes from a die to a sizing step, and provide profile shapes having improved resistance to whitening on bending in transparent products.

The third object of the present invention is to provide a profile shape, which has improved sagging during profile extrusion molding, shape accuracy at corners and edges of profile shapes from a die to a sizing step, and improved surface smoothness, and also improved resistance to whitening on bending in a transparent product.

According to the present invention, the above objects are achieved by:

(I) a polyester resin composition for profile extrusion molding comprising
  (A) an amorphous polyester,
  (B) at least one component selected from the group consisting of (B1) a crystalline polyester and (B2) a nucleating agent, and optionally
  (C) a reactive compound;

(II) a polyester resin composition for profile extrusion molding comprising a polyester resin, and a reactive compound having a weight average molecular weight of 200 to 500,000; and (III) a profile shape comprising a resin having a reduced viscosity ratio of 1.01 to 3.00, a reduced viscosity ratio being a ratio of a reduced viscosity of a resin after molding to that of a resin before molding.

Also, a profile shape, which is obtained by profile extrusion molding the polyester resin composition (I) or (II), is covered by the present invention.

DETAILED DESCRIPTION OF THE INVENTION

Figure 1:
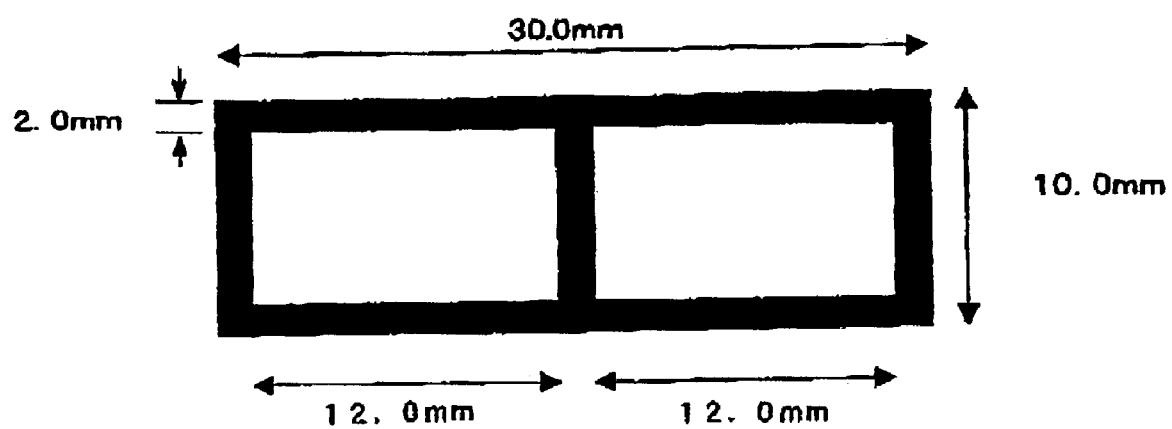
FIG. 1 is a plan view of a profile shape, which is produced for evaluating the product-drawing conditions and the accuracy and surface smoothness of the product in Examples 34–41 and Comparative Examples 11–20.

The kind of the polyester resin used according to the present invention is not limited, and may be any polyester comprising a dicarboxylic acid and an alcohol.

The polyester in the polyester resin composition according to the present invention is preferably an amorphous polyester. In particular, the polyester used as the component (A) of the polyester resin composition (I) is an amorphous polyester. When the polyester is amorphous, it can make the product transparent since the product is less whitened with crystals.

Herein, the term "amorphous polyester" means a polyester which has no melting peak in two heating steps when it is heated from −100° C. to 300° C. at a heating rate of 20° C./min., cooled to −100° C. at a cooling rate of 50° C./min. and again heated from −100° C. to 300° C. at a heating rate of 20° C./min. using a differential scanning calorimeter (DSC). The term "crystalline polyester" means a polyester which has a distinct melting peak in either of the two heating steps.

When an amorphous polyester is used as a polyester according to the present invention, it preferably comprises an aromatic carboxylic acid having 8 to 14 carbon atoms and an aliphatic or cycloaliphatic glycol having 2 to 10 carbon atoms as main components. Here, the "main component" means that an amount of an aromatic carboxylic acid having 8 to 14 carbon atoms or an aliphatic or cycloaliphatic glycol having 2 to 10 carbon atoms is at least 50% by mole, preferably at least 60% by mole, more preferably at least 65% by mole, based on the whole amount the acid component(s) or the alcohol component(s) (which is 100% by mole). When an amount of either the aromatic carboxylic acid having 8 to 14 carbon atoms or the aliphatic or cycloaliphatic glycol having 2 to 10 carbon atoms is less than 50% by mole, the profile shape produced by profile extrusion molding may have decreased elongation and mechanical properties.

More preferably, the aromatic carboxylic acid having 8 to 14 carbon atoms is terephthalic acid, isophthalic acid or their mixture. When such a dicarboxylic acid is used, the profile shape produced by profile extrusion molding has further improved elongation and mechanical properties. The aromatic carboxylic acid comprises at least 50% by mole, preferably at least 60% by mole of terephthalic acid, while it preferably comprises terephthalic acid and isophthalic acid.

The amorphous polyester resin may comprise other polybasic carboxylic acid other than terephthalic acid and isophthalic acid. Example of the other polybasic carboxylic acid include orthophthalic acid, naphthalenedicarboxylic acid, succinic acid, adipic acid, azelaic acid, sebacic acid, decanoic acid, dimer acid, cyclohexanedicarboxylic acid, trimellitic acid, etc.

The alcohol component of the polyester resin used according to the present invention preferably comprises an aliphatic or cycloaliphatic glycol having 2 to 10 carbon atoms as a main component. The aliphatic or cycloaliphatic glycol having 2 to 10 carbon atoms is preferably at least one alcohol selected from the group consisting of ethylene glycol, diethylene glycol, neopentyl glycol, cyclohexanedimethanol, 1,3-propanediol and 2-methyl-1,3-propanediol, from the viewpoint of easy availability and costs of the alcohol. The aliphatic or cycloaliphatic glycol preferably comprises at least 50% by mole, more preferably at least 60% by mole of ethylene glycol, since the impact resistance of the profile shape may be improved.

Specific examples of the combination of the components of suitable amorphous polyester include (terephthalic acid/isophthalic acid)/ethylene glycol=(90-70/10-30)/100% by mole, terephthalic acid/(ethylene glycol/,1,2-propylene glycol)=100/(80-50/20-50) % by mole, (terephthalic acid/isophthalic acid)/(ethylene glycol/1,3-propylene glycol)=(95-80/5-20)/(90-70/10-30) % by mole, (terephthalic acid/isophthalic acid)/(ethylene glycol/1,4-butanediol)=(95-70/5-30)/(90-50/10-50) % by mole, terephthalic acid/(ethylene glycol/2-methyl-1,3-propanediol)=100/(60-80/40-20) % by mole, (terephthalic acid/isophthalic acid)/(ethylene glycol/2-methyl-1,3-propanediol)=(95-80/5-20)/(70-90/30-10) % by mole, terephthalic acid/(ethylene glycol/neopentyl glycol)=100/(85-60/15-40) % by mole, (terephthalic acid/isophthalic acid)/(ethylene glycol/neopentyl glycol)=(95-80/5-20)/(90-70/10-30) % by mole, terephthalic acid/(ethylene glycol/diethylene glycol)=100/(75-50/25-50) % by mole, (terephthalic acid/isophthalic acid)/(ethylene glycol/diethylene glycol)=(95-80/5-20)/(90-75/10-25) % by mole, and terephthalic acid/(ethylene glycol/1,4-cyclohexanedimethanol)=100/(80-60/20-40) % by mole.

Examples of the more preferably combination include terephthalic acid/)ethylene glycol/neopentyl glycol)=100/(85-60/15-40) % by mole, (terephthalic acid/isophthalic acid)/(ethylene glycol/neopentyl glycol)=(95-80/5-20)/(90-70/10-30) % by mole, terephthalic acid/(ethylelene glycol/diethylene glycol)=100/(75-50/25-50) % by mole, (terephthalic acid/isophthalic acid)/(ethylene glycol/diethylene glycol)=(95-80/5-20)/(90-75/10-25) % by mole, and terephthalic acid/(ethylene glycol/1,4-cyclohexanedimethanol)=100/(80-60/20-40) % by mole.

Among them, the combination of ethylene glycol and neopentyl glycol (60/40-90/10 by mole) and the combination of ethylene glycol and 1,4-cyclohexanedimethanol (60/40-90/10 by mole) are particularly preferable since they achieve the good profile extrusion molding properties and the transparency of the profile shapes at the same time. Further, the combination of ethylene glycol and neopentyl glycol is most preferable.

Besides ethylene glycol, diethylene glycol, neopentyl glycol, cyclohexanedimethanol, 1,3-propanediol and 2-methyl-1,3-propanediol, the amorphous polyester resin may comprise other polyhydric alcohol as an alcohol component. Examples of the other polyhydric alcohol include 1,2-butanediol, 1,3-butanediol, 1,4-butanediol, 1,5-pentanediol, 3-methyl-1,5-pentanediol, hexanediol, nonanediol, dimer diol, ethylene oxide and/or propylene oxide adducts of bisphenol A, polyethylene glycol, polypropylene glycol, polytetramethylene glycol, 2-butyl-2-ethyl-1,3-propanediol, tricyclodecanedimethanol, neopentyl hydroxypivalate, 2,2,4-trimethyl-1,5-pentanediol, trimethylolpropane, etc.

The crystalline polyester resin used according to the present invention, for example, the crystalline polyester resin (B1) contained in the polyester resin composition (I), preferably has a melting point of 90 to 220° C. The lower limit of the melting point is preferably 100° C., more preferably 110° C., while the upper limit of the melting point is preferably 200° C., more preferably 190° C.

When the melting point is lower than 90° C., the crystallinity decreases so that the solvent resistance and detergent resistance of the polyester may deteriorate. When the melting point exceeds 220° C., a barrel temperature of an extruder used in the profile extrusion molding process should be set high and the molecular weight of the polyester decreases due to hydrolysis, so that the resin may sag during extrusion molding, or the mechanical properties of the profile shape may deteriorate.

The crystalline polyester used according to the present invention preferably comprises, based on the whole amount of the alcohol component (100% by mole), at least 50% by mole, more preferably at least 55% by mole, particularly preferably at least 60% by mole, of at least one alcohol selected from the group consisting of ethylene glycol, 1,3-propanediol, 1,4-butanediol, 1,6-hexanediol and cyclohexanedimethanol. To exert the solvent resistance, it is important for the crystalline polyester contained in the profile shape to quickly crystallize. Thus, the polyester resin comprises at least 50 by mole of the above alcohol component(s) to impart sufficient crystallinity to the resin. When the amount of the above alcohol component(s) is less than 50% by mole, the solvent resistance may decrease. Among the above alcohol components, ethylene glycol, 1,3-propanediol and/or 1,4-butanediol are preferably used from the viewpoint of the solvent resistance, since the polyester resin is relatively quickly crystallized.

The crystalline polyester resin used according to the present invention may comprise a polybasic carboxylic acid and/or a polyhydric alcohol besides the ethylene glycol, 1,3-propanediol, 1,4-butanediol, 1,6-hexanediol and cyclohexanedimethanol. Examples of the polybasic carboxylic acid include terephthalic acid, isophthalic acid, orthophthalic acid, naphthalenedicarboxylic acid, succinic acid, adipic acid, azelaic acid, sebacic acid, decanoic acid, dimer acid, cyclohexanedicarboxylic acid, trimellitic acid, etc. Examples of the polyhydric alcohol include 1,2-butanediol, 1,3-butanediol, 1,5-pentanediol, 3-methyl-1,5-pentanediol, 2-methyl-1,3-propanediol, nonanediol, dimer diol, ethylene oxide and/or propylene oxide adducts of bisphenol A, polyethylene glycol, polypropylene glycol, polytetramethylene glycol, 2-butyl-2-ethyl-1,3-propanediol, tricyclodecanedimethanol, neopentyl hydroxypivalate, 2,2,4-trimethyl-1,5-pentanediol, trimethylolpropane, etc.

The composition of the polyester resin used according to the present invention can be quantitatively determined with $^1$H-NMR or $^{13}$C-NMR in which the polyester resin is dissolved in a solvent such as deuterochloroform, or gas chromatography in which the polyester is subjected to the measurement after methanolysis. Among them, $^1$H-NMR is preferable because of the simplicity of the measurement.

The amorphous or crystalline polyester resin used according to the present invention preferably has a number average molecular weight of 15,000 to 40,000, more preferably from 18,000 to 35,000, particularly preferably from 20,000 to 35,000. When the number average molecular weight is less than 15,000, the profile shape has low strength elongation because of the insufficient cohesion force of the resin so that the resin becomes brittle and may not be used. When the number average molecular weight exceeds 40,000, the melt viscosity excessively increases and thus the optimum temperature for profile extrusion molding rises. As a result, the profile extrusion shapability of the resin deteriorates.

The polyester resin used according to the present invention preferably has an acid value of 100 eq./$10^6$ g or less, more preferably 50 eq./$10^6$ g or less, particularly preferably 40 eq./$10^6$ g or less. The lower limit of the acid value is preferably as small as possible. When the acid value exceeds 100 eq./$10^6$ g, the hydrolysis of the polyester resin is accelerated when the resin is heated in the process of profile extrusion molding and thus the mechanical properties of the profile shape may deteriorate. As the decomposition of the resin proceeds, the sagging of the resin in the processing may worsen.

In the case of the polyester resin composition (I) of the present invention, when the crystalline polyester (B1) is added to the amorphous polyester (A), the lower limit of the amount of the amorphous polyester (A) is preferably 30 parts by weight, more preferably 50 parts by weight, particularly preferably 65 parts by weight, based on 100 parts by weight of the total of the two polyesters. The upper limit of the amount of the amorphous polyester (A) is preferably 97 parts by weight, more preferably 90 parts by weight. Accordingly, the lower limit of the amount of the crystalline polyester (B1) is preferably 3 parts by weight, more preferably 5 parts by weight, while the upper limit thereof is preferably 70 parts by weight, more preferably 50 parts by weight, particularly preferably 35 parts by weight.

When the amount of the amorphous polyester (A) is less than 30 parts by weight, it becomes difficult to control the viscoelasticity of the polyester to prevent the resin sagging at a processing temperature in the profile extrusion molding process, and further the crystallization of the profile shape obtained becomes remarkable so that the appearance of the article may be whitened. When the amount of the amorphous polyester exceeds 97 parts by weight, the effects of the crystalline resin are not sufficiently attained so that the profile shape may not have the solvent resistance and the detergent resistance.

In the case of the polyester resin composition (I) of the present invention, the nucleating agent (B2) can be added to the amorphous polyester (A) in addition to or in place of the crystalline polyester (B1). In this case, the lower limit of the amount of the nucleating agent is preferably 0.1 parts by weight, more preferably 0.5 parts by weight, while the upper limit of the amount of the nucleating agent is preferably 10 parts by weight, more preferably 5 parts by weight, each per 100 parts by weight of the polyester resin. When the amount of the nucleating agent is less than 0.1 parts by weight, the finely crystallizing size may not be attained so that the solvent resistance may decrease. When the amount of the nucleating agent exceeds 10 parts by weight, the flowability of the composition in the profile extrusion molding process and the mechanical properties of the profile shape may unpreferably deteriorate.

The nucleating agent increases the crystallization rate of the crystalline polyester and the orientation of the amorphous polyester to quickly complete the crystallization and orientation, and also controls the size of each spherulite through the adjustment of the number of crystal nuclei. When the diameter of the spherulite formed is much smaller than the wavelength of visible light, the resin composition does not lose its transparency even after the crystallization of the resin. Thus, the resin composition achieves the transparency and the solvent resistance at the same time. The diameter of the spherulite is preferably 300 nm or less, more preferably 200 nm or less, particularly preferably 100 nm or less.

Specific examples of the nucleating agent include inorganic fine powder such as talc, silica, graphite, carbon powder, pyrophillite, gypsum, neutral clay, etc.; metal oxides such as magnesium oxide, aluminum oxide, titanium oxide, etc.; salts such as sulfates, phosphates, silicates, oxalates, stearates, benzoates, salicylates, tartarates, sulfonates, montan wax salts, montan wax ester salts, terephthalates, carboxylates, etc.; and ionic copolymers of α-olefins and α,β-unsaturated carboxylic acids. Among them, oxalates, stearates, benzoates, salicylates, tartarates, sulfonates, montan wax salts, montan wax ester salts, terephthalates, carboxylates and the ionic copolymers of α-olefins and α,β-unsaturated carboxylic acids are preferable since they are quite effective.

In general, amorphous polyester has low solvent resistance and thus its surface is roughened with solvents, or it is whitened with solvents although it is an amorphous resin. According to the present invention, the addition of the crystalline polyester (B1) and/or the nucleating agent (B2) to the amorphous polyester (A) improves the solvent resistance of the amorphous polyester. Furthermore, the addition of the crystalline polyester (B1) and/or the nucleating agent (B2) can further increase the edge accuracy of the profile shape.

In one preferable embodiment of the present invention, the crystalline polyester (B1) and the nucleating agent (B2) are both used.

The kind of the reactive compound used according to the present invention is not limited as long as the compound has, in the molecule, a functional group which can react with the hydroxyl group and carboxyl group of the polyester. Preferably, the reactive compound has at least two functional groups per molecule, since the resin is partially crosslinked. The use of the reactive compound improves the melt strength of the resin composition since the polyester resin forms a partially crosslinked product when the reactive compound reacts with the hydroxyl group and carboxyl group of the polyester to form a reaction product in the melt extrusion process.

Specific examples of the functional group of the reactive compound include an isocyanate group, a glycidyl group, a carboxyl group, a metal carboxylate salt group, an ester group, a hydroxyl group, an amino group, a carbodiimide group, a glycidyl group, as well as a functional group which is ring-opened and added to the polyester terminals such as lactone, latcide, lactam, etc. The reactive compound may have two or more different functional groups in the molecule.

Among them, the glycidyl group or the isocyanate group is preferable because of a high reaction rate.

The configuration of the functional group in the reactive compound is arbitrary. For example, the functional group may be present on the backbone, side chain or terminal of the polymer. In addition, a low molecular weight compound having a functional group described above can be used as long as it satisfies the molecular weight requirement described below.

Specific examples of the reactive compound include styrene/methyl methacrylate/glycidyl methacrylate copolymers, epoxy compounds such as bisphenol A type, cresol/novolak type and phenol/novolak type, isocyanate compounds, etc. They may be used as a mixture thereof.

The weight average molecular weight of the reactive compound used according to the present invention is preferably from 200 to 500,000 to prevent the whitening on bending of the profile shape and bleeding out of the unreacted compound at the same time. The lower limit of the weight average molecular weight of the reactive compound is preferably 500, more preferably 700, most preferably 1000, while the upper limit is preferably 300,000, more preferably 100,000, most preferably 50,000.

When the weight average molecular weight of the reactive compound is less than 200, the unreacted reactive compound bleeds out on the surface of the profile shape, which may result in the decrease of the adhesion properties and the surface contamination of the article. When the weight average molecular weight of the reactive compound exceeds 500,000, voids may form on bending so that the possibility of whitening on bending tends to increase since the compatibility of the melt-strength intensifier with the amorphous polyester may decrease.

The amount of the reactive compound added can be selected according to the molecular weight of the compound and the number of the functional groups introduced. The amount of the reactive compound is preferably from 0.1% by weight to 20% by weight per 100 parts of the amorphous polyester in the case of the polyester resin composition (I) or the polyester resin in the case of the polyester resin composition (II). More preferably, the lower limit of the amount of the reactive compound is 0.5% by weight, while the upper limit is 15% by weight. When the amount of the reactive compound is less than 0.1% by weight, the desired effect to prevent resin sagging may not be attained. When the amount of the reactive compound exceeds 20% by weight, the mechanical properties of the profile shape may be influenced.

It is very important for the composition of the present invention to maintain the transparency of the profile shape containing the reactive compound. To maintain the transparency, there are some methods, for example, the refractive index of the reactive compound is adjusted to that of the resin, the particle size of the reactive compound dispersed in the resin is greatly decreased to less than the wavelength of the visible light, and so on. Any method can be employed as long as the transparency of the article is maintained.

The nucleating agent and/or the reactive compound may be added to the polyester resin by any method. For example, they are added to the polyester resin under pressure in the melt extrusion process, they are compounded in the pellets of the polyester resin before extrusion, or they are added and kneaded in the polyester resin and then the mixture is extruded again.

The polyester resin composition (I) or (II) of the present invention preferably has a melt viscosity of 6000 to 600,000 dPa·sec., more preferably 7000 to 100,000 dPa·sec., particularly preferably 8000 to 50,000 dPa·sec., when measured at 220° C. at a shear rate of 100 sec$^{-1}$. When the melt viscosity is less than 6000 dPa·sec., the sagging of the resin may be worsened in the processing. When the melt viscosity exceeds 600,000 dPa·sec., such a high melt viscosity may not be practically advantageous since the productivity decreases.

In the present invention, an acrylic polymer having a ultra high molecular weight or an acrylic polymer copolymerized with a fluoropolymer may be added to the resin composition to increase the melt strength of the composition and prevent the sagging. In particular, an acrylic modified fluoropolymer (for example, Metablen A-3000 available from Mitsubishi Rayon Co., Ltd.) is suitable for the profile extrusion application since it can easily adjust the viscoelasticity of the resin composition with a very small amount. The amount of such a polymer added is preferably from 0.01 to 1 parts, more preferably from 0.02 to 0.5 parts, per 100 parts of the polyester resin.

Other component may optionally be added to the polyester composition of the present invention according to the applications of the composition. Examples of the other component include impact modifiers, fillers, UV-ray absorbers, surface treating agents, lubricants, light-stabilizers, pigments, antistatic agents, antimicrobials, crosslinking agents, sulfur type antioxidants, flame retardants, plasticizers, processing aids, foaming agents, etc.

The conditions for profile extrusion molding the resin composition of the present invention should be such that the melt of the composition can be effectively mixed, since the polyester in the melt state and the reactive compound should be mixed.

For example, the polyester resin composition is profile extrusion molded with an extruder such as a single-screw extruder or a twin-screw extruder, although other molding equipment may be used as long as the polyester resin and the reactive compound can be thoroughly mixed in the profile extrusion process.

In addition, a means for kneading the polyester resin and the reaction compound and then extruding the kneaded polyester again may be used.

The extrusion temperature may be any temperature in a range in which the polyester resin to be extruded is molten and flowed. The extrusion temperature is preferably from 100° C. to 350° C., more preferably from 150° C. to 300° C. from the viewpoint of the thermal properties of the polyester. When the extrusion temperature is too low, the polymer cannot be extruded or an excessive load is applied to the extruder. When the extrusion temperature is too high, the polymer is thermally degraded unpreferably.

The throughput and other conditions in the profile extrusion process can be suitably adjusted according to the optimum conditions for the specific equipment.

The profile shape (III) of the present invention has a reduced viscosity ratio (a ratio of a reduced viscosity of a resin after molding to that of a resin before molding) of 1.01 to 3.00.

The kind of the resin constituting the profile shape (III) is not limited. Preferably, a polyester resin is used. The polyester resin is particularly preferably the polyester resin composition of the present invention, which is described above.

Herein, the ratio of a reduced viscosity of a resin after molding to that of a resin before molding means a ratio calculated using a reduced viscosity of a resin (or a mixture or composition comprising a resin) measured before the profile extrusion molding, and a reduced viscosity of a resin (or a mixture or composition comprising a resin) measured after the profile extrusion molding.

In an extruder, a resin alone, a mixture containing a resin or a pellet-form resin composition which has been produced by melt kneading a mixture containing a resin (hereinafter, they may be collectively referred to as "resin") is charged from a hopper and profile extruded. The reduced viscosity of the resin before the molding is measured using the resin alone or the mixture containing the resin as it is. In the case of the mixture containing the resin, the components are milled and uniformly mixed and then the reduced viscosity is measured, but the reduced viscosity is not measured after melt mixing. Once the mixture is melt mixed, the components react each other so that an exact reduced viscosity may not be measured.

The sagging of the resin, which occurs in the profile extrusion molding of the polyester resin, can be controlled by adjusting the reduced viscosity ratio. That is, in the profile extrusion molding process, the melt strength can be maintained in the discharging step, when the polyester resin is branched with the reactive compound, and the viscosity of the resin is reduced in the high shear region of the die, while the viscosity is restored in the shear-free region after extrusion.

The reduced viscosity ratio is more preferably from 1.03 to 2.00, most preferably from 1.06 to 1.80. When the reduced viscosity ratio is less than 1.01, the sagging of the resin constituting the profile shape may not be suppressed, and the mechanical properties of the profile shape may decrease. When the reduced viscosity ratio exceeds 3.00, the melt strength excessively increases in the molding step and may exceed an applicable range for extrusion molding so that the composition may lose the applicability to general-purpose equipment.

The resin to be used for the production of the profile shape of the present invention preferably has a melt viscosity of 0.40 to 2.0 dl/g before molding and a melt viscosity of 0.41 to 2.5 dl/g after molding, more preferably, a melt viscosity of 0.50 to 1.5 dl/g before molding and a melt viscosity of 0.51 to 2.0 dl/g after molding, most preferably, a melt viscosity of 0.60 to 1.2 dl/g before molding and a melt viscosity of 0.61 to 1.5 dl/g after molding.

When the melt viscosity of the resin before molding is less than 0.40 dl/g, the viscosity is too low so that the extrusion shapability may decrease and the mechanical properties of the profile shape tend to deteriorate. When the resin having a reduced viscosity exceeding 2.5 dl/g before molding is profile extrusion molded, the melt viscosity of the resin excessively increases by the introduction of the branched structure with the reactive compound, so that the flowability of the resin decreases and thus the moldability decreases, or gel-like materials tend to form. When the reduced viscosity of the resin after molding is less than 0.41 dl/g, the sagging of the resin constituting the profile shape may not be suppressed, and the mechanical properties of the profile shape may decrease. When the reduced viscosity of the resin after molding exceeds 2.5 dl/g, the gel-like materials tend to form, or the melt strength excessively increases in the molding step so that it may exceeds an applicable range for extrusion molding with some molding machines and the resin may lose the applicability to general-purpose equipment.

Preferably, an antioxidant is compounded in the polyester resin composition or the resin composition of the present invention to suppress the thermal degradation of the polyester resin during processing (i.e. to prevent coloring or sagging of the resin caused by thermal degradation). Preferable examples of the antioxidant are phenolic antioxidants, organic phoshite ester antioxidants, etc.

Specific examples of the phenolic antioxidant include 2,6-di-tert-butylphenol, 2,6-di-tert-butyl-4-methylphenol, 2,6-di-tert-butyl-4-ethylphenol, 2-tert-butyl-4,6-dimethylphenol, 2,4,6-tri-tert-butylphenol, 2-tert-butyl-4-methoxyphenol, 3-methyl-4-isopropylphenol, 2,6-di-tert-butyl-4-hydroxymethylphenol, 2,2-bis(4-hydroxylphenyl)-propane, bis(5-tert-butyl-4-hydroxy-2-methylphenyl)sulfide, 2,5-di-tert-amylhydroquinone, 2,5-di-tert-butylhydroquinone, 1,1-bis(3-tert-butyl-4-hydroxy-5-methylphenyl)butane, bis(3-tert-butyl-2-hydroxy-5-methylphenyl)methane, 2,6-bis(2-hydroxy-3-tert-butyl-5-methylbenzyl)-4-methylphenol, bis(3-tert-butyl-4-hydroxy-5-methylbenzyl)sulfide, bis(3-tert-butyl-5-ethyl-2-hydroxyphenyl)methane, bis(3,5-di-tert-butyl-hydroxyphenylmethane, bis(3-tert-butyl-2-hydroxy-5-methylphenyl)sulfide, 1,1-bis(4-hydroxyphenyl) cyclohexane, ethylene bis[3,3-bis(3-tert-butyl-4-hydroxyphenyl)butyrate], bis[2-(2-hydroxy-3-tert-butyl-5-methylbenzyl)-4-methyl-6-tert-butylphenyl]terephthalate, 1,1-bis(2-hydroxy-3,5-dimethylphenyl)-2-methylpropane, 4-methoxyphenol, cyclohexylphenol, p-phenylphenol, catechol, hydroquinone, 4-tert-butylpyrocatechol, ethyl galate, propyl galate, octyl galate, lauryl galate, cetyl galate, β-naphthol, 2,4,5-trihydroxybutylphenonem, tris(3,5-di-tert-butyl-4-hydroxyphenyl) isocyanate, 1,3,5-trimethyl-2,4,6-tris(3,5-di-tert-butyl-4-hydroxybenzyl)benzene, 1,6-bis[2-(3,5-di-tert-butyl-4-hydroxyphenyl)propionyloxy]hexane, tetrakis[3-(3,5-di-tert-butyl-4-hydroxydiphenyl)-propionyloxymethyl]methane, bis(3-cyclohexyl-2-hydroxy-5-methylphenyl)methane, bis[3-(3,5-di-tert-butyl-4-hydroxyphenyl)propionyloxyethyl]sulfide, n-octadecyl-3-(3,5-di-tert-butyl-4-hydroxyphenyl) propionate, bis[3-(3,5-di-tert-butyl-4-hydroxyphenyl)propyonylamino]hexane, 2,6-bis(3-tert-butyl-2-hydrethylphenyl)-4-methylphenol, bis[S-(4-tert-butyl-3-hydroxy-2,6-dimethylbenzyl)]thioterephthalate, tris[3-(3,5-di-tert-butyl-4-hydroxyphenyl)propionyloxyethyl] isocyanurate, tris(3,5-di-tert-butyl-4-hydroxybenzyl) isocyanurate, 1,1,3-tris(3-tert-butyl-4-hydroxy-6-mathylphenyl)butane, etc. These compounds may be used independently or as a mixture of two or more of them.

The upper limit of the amount of the phenolic antioxidant added is preferably 1.0 part by weight, particularly preferably 0.8 part by weight, while the lower limit is preferably 0.01 part by weight, particularly preferably 0.02 part by weight. When the amount of the phenolic antioxidant is less than 0.01 part by weight, the thermal degradation of the resin in the processing process may not be prevented. When the amount of the phenolic antioxidant exceeds 1.0 part by weight, the effect to prevent the thermal degradation saturates, and such a large amount is uneconomical.

Specific examples of the organic phosphite ester compound include triphenyl phosphite, tris(methylphenyl) phosphite, triisooctyl phosphite, tridecyl phosphite, tris(2-ethylhexyl) phosphite, tris(nonylphenyl) phosphite, tris (octylphenyl) phosphite, tris[decylpoly(oxyethylene)] phosphite, tris(cyclohexylphenyl) phosphite, tricyclohexyl phosphite, tridecyl thiophosphite, triisodecyl thiophosphite, phenyl bis(2-ethylhexyl) phosphite, phenyl diisodecyl phosphite, tetradecyl poly(oxyethylene)bis(ethylphenyl) phosphite, phenyl dicyclohexyl phosphite, phenyl diisooctyl phosphite, phenyl di(tridecyl) phosphite, diphenyl cyclohexyl phosphite, diphenyl isooctyl phosphite, diphenyl 2-ethylhexyl phosphite, diphenyl isodecyl phosphite, diphenyl cyclohexylphenyl phosphite, diphenyl tridecyl thiophosphite, nonylphenyl ditridecyl phosphite, phenyl p-tert-butylphenyl dodecyl phosphite, diisopropyl phosphite, bis [octadecylpoly(oxyethylene)]phosphite, octylpoly (oxypropylene) tridecylpoly(oxypropylene) phosphite, monoisopropyl phosphite, diisodecyl phosphite, diisooctyl phosphite, monoisooctyl phosphite, didodecyl phosphite, monododecyl phosphite, dicyclohexyl phosphite, monocyclohexyl phosphite, monododecylpoly(oxyethylene) phosphite, bis(cyclohexylphenyl) phosphite, monocyclohexyl phenyl phosphite, bis(p-tert-butylphenyl) phosphite, tetratridecyl 4,4'-isopropylidenediphenyl diphosphite, tetratridecyl 4,4'-butylidenebis(2-tert-butyl-5-methylphenyl) diphosphite, tetraisooctyl 4,4'-thiobis(2-tert-butyl-5-methylphenyl) diphosphite, tetrakis(nonylphenyl) poly(propyleneoxy)isopropyl diphosphite, tetratridecyl propyleneoxypropyl diphosphite, tetratridecyl 4,4'-isopropylidenedicyclohexyl diphosphite, pentakis (nonylphenyl) bis[poly(propyleneoxy)isopropyl] triphosphite, heptakis(nonylphenyl) tetrakis[poly (propyleneoxy)isopropyl]pentaphosphite, heptakis (nonylphenyl) tetrakis(4,4'-isopropylidenediphenyl) pentaphosphite, decakis(nonylphenyl) heptakis(propyleneoxyisopropyl) octaphosphite, decaphenyl heptakis(propyleneoxyisopropyl) octaphosphite, bis(butoxycarboethyl) 2,2-dimethylene-trimethylene dithiophosphite, bis(isooctoxycarbomethyl) 2,2-dimethylenetrimethylene dithiophosphite, tetradodecyl ethylene dithiophosphite, tetradodecyl hexamethylene dithiophosphite, tetradodecyl 2,2'-oxydiethylene dithiophosphite, pentadodecyl di(hexamethylene) trithiophosphite, diphenyl phosphite, 4,4'-isopropylidenedicyclohexyl phosphite, 4,4'-isopropylidenediphenyl $C_{12}$–$C_{15}$-alkyl phosphite, 2-tert-butyl-4-[1-(3-tert-butyl-4-hydroxydiphenyl)isopropyl]phenyl di(p-nonylphenyl) phosphite, ditridecyl 4,4'-butylidenebis(3-methyl-6-tert-butylphenyl) phosphite, dioctadecyl 2,2-dimethylenetrimethylene diphosphite, tris (cyclohexylphenyl)phosphite, hexatridecyl 4,4',4"-1,1,3-butanetolyl-tris(2-tert-butyl-5-methylphenyl) triphosphite, tridodecyl thiophosphite, decaphenyl heptakis(propyleneoxyisopropyl) octaphosphite, dibutyl pentakis(2,2-dimethylenetrimethylene) diphosphite, dioctyl pentakis(2,2-dimethylenetrimethylene) diphosphite, didecyl 2,2-dimethylenetrimethylene diphosphite; their metal salts with lithium, sodium, potassium, magnesium, calcium, barium, zinc and aluminum. These compounds may be used independently or as a mixture of two or more of them.

The upper limit of the organic phosphate ester compound is preferably 3.0 parts by weight, particularly preferably 2.0 parts by weight, while the lower limit is preferably 0.01 part by weight, particularly preferably 0.02 part by weight. When the amount of the organic phosphate ester compound is less than 0.01 part by weight, the effect to suppress the thermal degradation of the resin in the processing process may not be attained. When the amount of the organic phosphate ester compound exceeds 3.0 parts by weight, the effect to prevent the thermal degradation saturates, and such a large amount is uneconomical.

Preferably, the phenolic antioxidant and the organic phosphate ester compound are used in combination, since the effect to suppress the thermal degradation of the resin is further improved.

In the present invention, the polyester resin composition preferably has a storage modulus in tension mode of at least $10^7$ Pa at 25° C. and $10^7$ Pa or less at a temperature lower than 180° C. More preferably, in a temperature range of 250° C. or lower, the polyester resin has a temperature domain of at least 60 degrees Celsius in which the storage modulus in tension mode is from $10^7$ Pa to $10^6$ Pa. When the storage modulus in tension mode is less than $10^7$ Pa at 25° C., the polyester resin is not suitable as a substitute for a vinyl chloride resin. When the above temperature domain is at least 60 degrees Celsius, a suitable viscoelasticity, which can accommodate with the fluctuation and the distribution of the temperature in the profile extrusion step, can be maintained.

The viscoelasticity suitable for the profile extrusion processing can be achieved by adding an adequate amount of the crystalline polyester to the amorphous polyester, or by adjusting the amount of the nucleating agent to be added.

Alternatively, the viscoelasticity suitable for the profile extrusion processing can be achieved by introducing branches in the polymer chains with the addition of a small amount of an isocyanate curing agent such as dimer TDI or a bisphenol A or phenol novolak epoxy curing agent to the resin composition. In particular, the dimer TDI (Desmodule TT available from BASF) is suitable for introducing the branches in the polyester having hydroxyl terminal groups since it has a high reactivity. The amount of such a curing agent is preferably from 0.05 to less than 10 parts by weight, more preferably from 0.2 to less than 2 parts by weight, per 100 parts by weight of the polyester resin.

Furthermore, the viscoelasticity suitable for the profile extrusion processing can be achieved by compounding an acrylic polymer having a ultra high molecular weight or an acrylic polymer copolymerized with a fluoropolymer. In particular, an acrylic modified fluoropolymer (for example, Metablen A-3000 available from Mitsubishi Rayon Co., Ltd.) is suitable for the profile extrusion application since it can easily adjust the viscoelasticity of the resin composition with a very small amount. The amount of such a polymer added is preferably from 0.01 to less than 1 parts, more preferably from 0.02 to less than 0.5 parts, per 100 parts of the polyester resin.

Herein, the storage modulus in tension mode is measured with a sheet-form sample of a resin using a dynamic viscoelastometer. The size of the sample sheet is a length of 15 mm (excluding grip margins), a width of 4 mm and a thickness of about 1 mm. The measuring condition includes scanning from –20° C. to a temperature at which no measurement is possible (maximum 250° C.) at a heating rate of 20° C./min. at a constant frequency of 10 Hz.

The sample sheet is prepared by pressing a polyester film, which is sandwiched between a pair of films having high heat resistance such as polyimide films, with a heat press which is set at a temperature at least 10° C. higher than the softening temperature of the polyester resin to obtain a smooth sheet.

EXAMPLES

The present invention will be illustrated by the following examples, which do not limit the scope of the present invention in any way.

The measured values described in Synthesis Examples are measured as follows:

Composition of Polyester:

A quantity of a polyester is dissolved in deuterochloroform and the solution is subjected to $^1$H-NMR.

Glass Transition Temperature and Melting Point:

A sample (10 mg) of a polyester resin is charged in an aluminum pan and sealed with a lid and then heated at a heating rate of 20° C./min. with a differential scanning calorimeter to measure a glass transition temperature and a melting point of the resin.

Number and Weight Average Molecular Weights:

The number and weight average molecular weights of a polyester resin are measured with gel permeation chromatography using hexafluoroisopropanol as a solvent in terms of polystyrene-converted molecular weights.

Acid Value:

A polyester resin (1 g) is dissolved in chloroform (30 ml), and the solution is titrated with a 0.1 N ethanol solution of potassium hydroxide to obtain an acid value. An indicator used is phenolphthalein.

Storage Modulus:

A sample of a polyester resin composition is placed on a desk-top type heat press (manufactured by TESTER Industries, Ltd.) which is adjusted at 200° C. through a polyimide film (CAPTON available from TORAY DUPONT Co., Ltd.) and maintained under a pressure of 2 N/mm$^2$ for 20 seconds to obtain a sample sheet having a thickness of 1 mm. Then, the sample sheet is cut to a size of a length of 15 mm (excluding grip margins) and a width of 4 mm and set on a dynamic viscoelastometer (DVA-200 manufactured by IT MEASUREMENT CONTROL Co., Ltd.), and a storage modulus in tension mode is measured. The measuring condition includes scanning from –20° C. to a temperature at which no measurement is possible (maximum 250° C.) at a heating rate of 20° C./min. at a constant frequency of 10 Hz.

Melt Strength:

Using an extruder (LABOPLASTOMILL manufactured by KABUSHIKIKAISHA TOYOSEIKI SEISAKUSHO; L/D=30, screw diameter=20 mm, full-flighted screw, compression ratio=2.0, distance from a die orifice to a ground surface=1 m), which is set at a revolution rate of 100 rpm and a whole barrel temperature of 200° C., a polymer used is extruded in a horizontal direction at a discharge rate of 48 g/min, and a time from the start of discharging of the polymer to touching of the polymer to the ground surface is measured to evaluate a melt strength. The longer time means a higher melt strength, since the polymer is not thinned by its own weight.

Synthesis Example of Amorphous Polyester (A)

In a reactor vessel equipped with a stirrer, a thermometer and a condenser for distillation, dimethyl terephthalate (960 parts by weight), ethylene glycol (527 parts by weight), neopentyl glycol (156 parts by weight) and tetrabutyl titanate (0.34 part by weight) were charged and the transesterification was carried out in a temperature range of 170 to 220° C. for 2 hours. After transesterification, the reaction system was heated from 220° C. to 270° C., while the vessel was slowly depressurized to 500 Pa over 60 minutes. Then, the polycondensation reaction was carried out under a pressure of 130 Pa or lower for 55 minutes to obtain amorphous polyester (A).

According to the NMR analysis, the composition of amorphous polyester (A) was such that the dicarboxylic acid component consisted of 100% by mole of terephthalic acid, and the diol component consisted of 80% by mole of etylene glycol and 20% by mole of neopentyl glycol. Polyester (A) had a glass transition temperature of 78° C., a number average molecular weight of 28,000 and an acid value of 30 eq./$10^6$ g.

Amorphous polyesters (B) to (E) and crystalline polyester (a) to (e) were prepared in the same manner as that for the preparation of amorphous polyester (A). The compositions and the results of the measurements are shown in Table 1. The numerical values in Table 1 are "% by mole" of each component in the polyesters.

Die No. 1 Garvey Type attached to the extruder, and the sagging of the molded article was evaluated. In this process, the drawing state of the molded article was evaluated by the occurrence of sagging according to the following criteria, and also the storage modulus of the sheet molded was measured.

TABLE 1

| | Synthetic Examples | | | | | | | |
|---|---|---|---|---|---|---|---|---|
| | Amorphous polyester | | | | Crystalline polyester | | | |
| | A | B | C | D | a | b | c | d |
| Acid | | | | | | | | |
| Terephthalic acid | 100 | 88 | 90 | 100 | 63 | 65 | 68 | 80 |
| Isophthalic acid | | | 10 | | 10 | | 32 | 20 |
| Adipic acid | | 12 | | | 27 | 35 | | |
| Diol | | | | | | | | |
| Ethylene glycol | 80 | 78 | 72 | 71 | | 35 | | 100 |
| Neopentyl glycol | 20 | | | | | | | |
| 2-Methyl-1,3-propanediol | | 22 | | | | | | |
| 1,3-Propanediol | | | 28 | | | | | |
| Cyclohexane-dimethanol | | | | 29 | | | | |
| 1,4-Butanediol | | | | | 100 | 64 | 93 | |
| Polytetramethylene glycol (MW = 1,000) | | | | | | 1 | 7 | |
| Physical properties | | | | | | | | |
| Number average molecular weight | 28,000 | 25,000 | 33,000 | 29,000 | 18,000 | 26,000 | 34,000 | 25,000 |
| Tg (° C.) | 78 | 55 | 58 | 78 | −6 | −9 | −32 | 70 |
| Melting point (° C.) | — | — | — | — | 160 | 135 | 142 | 198 |
| Acid value (eq./10$^6$ g) | 30 | 16 | 38 | 25 | 28 | 30 | 32 | 15 |

Examples 1–13 and Comparative Examples 1–2

The polyester shown in Table 1 and components shown in Table 2 were mixed in a beaker in amounts (parts by weight) shown in Table 2, and the mixture was kneaded with an extruder (LABOPLASTOMILL manufactured by KABUSHIKIKAISHA TOYOSEIKI SEISAKUSHO; L/D=30, screw diameter=20 mm, full-flighted screw, compression ratio=2.0), which was set at a revolution rate of 30 rpm and a whole barrel temperature of 180° C. The kneaded resin was profile extrusion molded with ASTM Extrusion Die No. 1 Garvey Type attached to the extruder, and the sagging of the molded article was evaluated.

Evaluation criteria:
A: The drawing (taking-off) is smooth without sagging.
B: The sagging occurs and the molded article cannot be conveyed to a sizing step.

The results are shown in Table 2.

The nucleating agent, the stabilizer, the curing agent and the additive shown in Table 2 were the following compounds:
I: Sodium stearate
II. Tris(3,5-di-tert-butyl-4-hydroxybenzyl) isocyanurate
III. Desmodule TT (available from BASF)
IV. Metablen A-3000 available from Mitsubishi Rayon Co., Ltd.

TABLE 2

| | | Examples | | | | | | | | | | | | | Comp. Ex. | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 |
| Amorphous polyester | A | 90 | 86 | 78 | | | | | | 88 | 93 | 80 | 90 | 90 | 100 | |
| | B | | | | 80 | | | | | | | | | | | |
| | C | | | | | 88 | | | | | | | | | | |
| | D | | | | | | 93 | 85 | 88 | | | | | | | |
| Crystalline polyester | a | 10 | 14 | 22 | | 5 | | 15 | | | | | 10 | 10 | | |
| | b | | | | | | 7 | | | | | | | | | |
| | c | | | | 20 | 7 | | | | 7 | | | | | | |
| | d | | | | | | | | | | | 20 | | | | 100 |

TABLE 2-continued

|  |  | Examples |  |  |  |  |  |  |  |  |  |  |  |  | Comp. Ex. |  |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 1 | 2 |
| Nucleating agent I |  | 1 | 1 | 1 | 1 | 1 | 1 | 1 | 1 | 1 | 1 | 1 | 1 | 1 |  |  |
| Stabilizer II |  | 0.3 | 0.3 | 0.3 | 0.3 | 0.3 | 0.3 | 0.3 | 0.3 | 0.3 | 0.3 | 0.3 | 0.3 | 0.3 |  | 0.3 |
| Curing agent III |  |  |  |  |  |  |  |  |  |  |  |  | 0.5 |  |  |  |
| Additive IV |  |  |  |  |  |  |  |  |  |  |  |  |  | 0.1 |  |  |
| Evaluation | Sagging | A | A | A | A | A | A | A | A | A | A | A | A | A | B | *2 |
|  | Modulus temp. domain*1 | 60 | 60 | 65 | 60 | 60 | 60 | 60 | 60 | 60 | 60 | 90 | 120 | 90 | 45 |  |
|  | Transparency | 4 | 4 | 5 | 4 | 4 | 4 | 4 | 4 | 4 | 5 | 5 | 5 | 4 | 4 |  |
|  | Solvent resistance | 5 | 5 | 5 | 5 | 5 | 4 | 4 | 4 | 5 | 4 | 5 | 5 | 5 | 1 |  |

Note:
*1 Modulus temperature domain means a width of a temperature domain in which a storage modulus in a tension mode is from $10^7$ Pa to $10^6$ Pa.
*2 Insoluble. Molding impossible.

In the Tables, the transprarency and solvent resistance are evaluated as follows:

Transparency:

Molded articles are compared with an eye and ranked according to the following criteria:

5: Extremely transparent
4: Highly transparent
3: Transparent
2: Very slightly opaque
1: Slightly opaque Solvent Resistance:

Molded articles are dipped in methyl ethyl ketone for 10 minutes. Then, the occurrence of whitening and/or swelling is compared with an eye and ranked according to the following criteria:

5: No change
4: No large change although slightly swelled
3: Whitened
2: Whitened and surfaces slightly swelled
1: Whitened and surfaces dissolved Synthesis Example of Reactive Compound (R)

In a reactor equipped with a stirrer, a thermometer, a reflux condenser and a quantitative titration apparatus, methyl ethyl ketone (50 parts) was charged and heated up to 70° C. Then, a solution of a mixture of styrene (36.4 parts), glycidyl methacrylate (37.3 parts) and methyl methacrylate (26.3 parts) and azobisdimethylvaleronitrile (2 parts) dissolved in methyl ethyl ketone (50 parts) was dropwise added in methyl ethyl ketone in the reactor at a rate of 1.2 ml/min. followed by stirring for 2 hours. Thereafter, the reactor was evacuated to remove methyl ethyl ketone from the reactor, and reactive compound (R) was obtained.

According to the NMR analysis, reactive compound (R) comprised 40% by mole of styrene, 30% by mole of glycidyl methacrylate and 30% by mole of methyl methacrylate, and had a glass transition temperature of 50° C. and a weight average molecular weight of 25,000.

Example 14

Amorphous polyester (A) (90 parts by weight), crystalline polyester (a) (10 parts by weight), reactive compound (R) (10 parts by weight), sodium stearate (1 part by weight) as a nucleating agent, and tris(3,5-di-tert-butyl-4-hydroxybenzyl) isocyanurate (0.3 part by weight) were mixed to obtain a mixture.

The resulting mixture was kneaded and profile extrusion molded using the same apparatus and the same conditions as those used in Examples 1–13. The drawing state and accuracy of the molded article were evaluated according to the following criteria:

A: The drawing is smooth without sagging, and the edge accuracy of the molded article is very good from the die to the sizing.
B: The drawing is smooth without sagging, and the edge accuracy of the molded article is good from the die to the sizing.
C: The resin sags so that it cannot be conveyed to the sizing step.

The results are shown in Table 3.

Examples 15–25 and Comparative Example 3

The experiments were carried out in the same manner as in Example 14 except that the materials shown in Table 3 were used.

The nucleating agent, stabilizer and additive shown in Table 3 are the same as those in Table 2, and the transparency and solvent resistance are evaluated in the same manners as in the case of Table 2.

TABLE 3

| | | Example | | | | | | | | | | | | | C. Ex. |
|---|---|---|---|---|---|---|---|---|---|---|---|---|---|---|---|
| | | 14 | 15 | 16 | 17 | 18 | 19 | 20 | 21 | 22 | 23 | 24 | 25 | 3 |
| Amorphous polyester | A | 90 | 86 | 78 | | | | | 93 | 80 | 90 | 100 | | |
| | B | | | | 80 | | | | | | | | | |
| | C | | | | | 88 | | | | | | | | |
| | D | | | | | | 93 | 85 | | | | | | |
| Crystalline polyester | a | 10 | 14 | 22 | | 5 | | 15 | | | | 10 | | |
| | b | | | | | | 7 | | | | | | | |
| | c | | | | 20 | 7 | | | 7 | | | | 100 | |
| | d | | | | | | | | | | 20 | | | 100 |
| Reactive compound R | | 10 | 10 | 10 | 10 | 10 | 10 | 10 | 10 | 10 | 10 | 10 | 10 | |
| Nucleating agent I | | 1 | 1 | 1 | 1 | 1 | 1 | 1 | 1 | 1 | 1 | | 1 | |
| Stabilizer II | | 0.3 | 0.3 | 0.3 | 0.3 | 0.3 | 0.3 | 0.3 | 0.3 | 0.3 | 0.3 | 0.3 | 0.3 | 0.3 |
| Additive IV | | | | | | | | | | | | 0.1 | | |
| Evaluation | Melt strength (sec.) | 22 | 23 | 24 | 23 | 22 | 21 | 22 | 21 | 23 | 25 | 20 | 26 | — |
| | Sagging (drawing) | A | A | A | A | A | A | A | A | A | A | B | A | — |
| | Transparency | 4 | 4 | 5 | 4 | 4 | 4 | 4 | 5 | 5 | 4 | 4 | 1 | — |
| | Solvent resistance | 5 | 5 | 5 | 5 | 5 | 4 | 4 | 4 | 5 | 5 | 1 | — | — |

Note:
In Example 25, solvent resistance was not evaluated, since transparency was not good.
In Comparative Example 3, the resin did not melt and thus it could not be molded.

Synthesis Example of Crystalline Polyester Resin (e)

In a reactor vessel equipped with a stirrer, a thermometer and a condenser for distillation, terephthalic acid (530 parts by weight), isophthalic acid (85 parts by weight), adipic acid (203 parts by weight), 1,4-butanediol (928 parts by weight) and tetrabutyl titanate (0.34 part by weight) were charged and the transesterification was carried out in a temperature range of 170 to 220° C. for 2 hours. After transesterification, the reaction system was heated from 220° C. to 260° C., while the vessel was slowly depressurized to 500 Pa over 60 minutes. Then, the polycondensation reaction was carried out under a pressure of 130 Pa or lower for 55 minutes to obtain polyester (e).

According to the NMR analysis, the composition of the polyester (e) was such that the dicarboxylic acid component consisted of 63% by mole of terephthalic acid, 10% by mole of isophthalic acid and 27% by mole of adipic acid, and the diol component consisted of 100% by mole of 1,4-butanediol. Polyester (e) had a glass transition temperature of −6° C., a number average molecular weight of 35,000 and an acid value of 28 eq./$10^6$ g.

Crystalline polyesters (f) and (g) were prepared in the same manner as that for the preparation of polyester (e). The compositions and the results of the measurements are shown in Table 4. The numerical values in Table 4 are "% by mole" of each component in the polyester.

Synthesis Example of Amorphous Polyester (E)

In a reactor vessel equipped with a stirrer, a thermometer and a condenser for distillation, dimethyl terephthalate (960 parts by weight), ethylene glycol (527 parts by weight), neopentyl glycol (156 parts by weight) and tetrabutyl titanate (0.34 part by weight) were charged and the transesterification was carried out in a temperature range of 170 to 220° C. for 2 hours. After transesterification, the reaction system was heated from 220° C. to 270° C., while the vessel was slowly depressurized to 500 Pa over 60 minutes. Then, the polycondensation reaction was carried out under a pressure of 130 Pa or lower for 55 minutes to obtain amorphous polyester (E).

According to the NMR analysis, the composition of amorphous polyester (E) was such that the dicarboxylic acid component consisted of 100% by mole of terephthalic acid, and the diol component consisted of 80% by mole of ethylene glycol and 20% by mole of neopentyl glycol. Amorphous polyester (E) had a glass transition temperature of 78° C., a number average molecular weight of 28,000 and an acid value of 30 eq./$10^6$ g.

Amorphous polyesters (F), (G) and (H) were prepared in the same manner as that for the preparation of amorphous polyester (E). The compositions and the results of the measurements are shown in Table 4.

TABLE 4

| | | Synthetic Examples | | | | | | |
|---|---|---|---|---|---|---|---|---|
| | | Crystalline Polyester | | | Amorphous Polyester | | | |
| | | e | f | g | E | F | G | H |
| Acid | Terephthalic acid | 63 | 65 | 68 | 100 | 88 | 90 | 100 |
| | Isophthalic acid | 10 | | 32 | | | 10 | |
| | Adipic acid | 27 | 35 | | | | 12 | |
| Alcohol | Ethylene glycol | | | 35 | 80 | 78 | 72 | 71 |
| | Neopentyl glycol | | | | 20 | | | |
| | 2-Methyl-1,3-propanediol | | | | | 22 | | |
| | 1,3-Propanediol | | | | | | | 28 |

TABLE 4-continued

|  |  | Synthetic Examples | | | | | | |
|---|---|---|---|---|---|---|---|---|
|  |  | Crystalline Polyester | | | Amorphous Polyester | | | |
|  |  | e | f | g | E | F | G | H |
|  | Cyclohexanedimethanol |  |  |  |  |  |  | 29 |
|  | 1,4-butanediol | 100 | 64 | 93 |  |  |  |  |
|  | 1,6-hexanediol |  |  |  |  |  |  |  |
|  | Polytetramethylene glycol (MW 1,000) |  | 1 | 7 |  |  |  |  |
| Physical | Number average molecular weight | 35,000 | 26,000 | 34,000 | 28,000 | 25,000 | 33,000 | 29,000 |
| properties | Glass transition temperature (° C.) | −6 | −9 | −32 | 78 | 55 | 58 | 78 |
|  | Melting point (° C.) | 160 | 135 | 142 | — | — | — | — |
|  | Acid value (eq./$10^6$ g) | 28 | 30 | 32 | 30 | 16 | 38 | 25 |

Example 26

Polyester (e) (100 parts by weight), reactive compound (R) (10 parts by weight) and tris(3,5-di-tert-butyl-4-hydroxybenzyl) isocyanurate (0.3 part by weight) as a stabilizer were mixed to obtain a mixture.

The resulting mixture was kneaded and profile extrusion molded using the same apparatus and the same conditions as those used in Examples 1–13. The drawing state and accuracy of the molded article were evaluated in the same manner as in Example 14–25.

The results are shown in Table 5.

Examples 27–33 and Comparative Examples 4–10

The same procedures as those in Example 26 were repeated except that the materials shown in Table 5 were used. Among the molded articles obtained, with those comprising polyesters (E) to (H), the whitening on bending was also evaluated with an eye. Whitening was not or hardly observed in the Examples, and the molded articles had no problem.

The stabilizer and the additive shown in Table 5 are the same as those shown in Table 2.

In Examples 29–33 and Comparative Examples 7–10, which used amorphous polyesters (E) to (H), the molded articles were compared with an eye and their transparency was evaluated according to the same criteria as those used in the previous Examples. The results are shown in Table 5.

Synthesis Examples of Polyester Resins (I), (h) and (i)

Crystalline polyester resin (I) and amorphous polyester resins (h) and (i) were prepared in the same manner as that employed in the preparation of polyester resin (E) and polyester resin (e), respectively. The composition and the results of evaluations are shown in Table 6.

The reduced viscosities and the compositions of the resins described in the Synthesis Examples were measured as follows:

Reduced Viscosity:

A sample of the resin (0.1 g) was dissolved in a mixed solvent of phenol and tetrachloroethane (6:4 by weight) (25 ml) and a reduced viscosity was measured with a Ubbellohde viscometer at 30° C. The unit of a reduced viscosity is "d/g".

Composition of Resin:

The composition of an amorphous copolyester was measured by subjecting the deuterochloroform solution of the polyester to $^1$H-NMR using a NMR analyzer (Gemini 2000 manufactured by Varian) and calculating the composition based on integrated intensity ratios.

The glass transition temperature, melting point and acid values were measured by the same methods as those described in connection with Table 2.

TABLE 5

|  |  | Example | | | | | | | | Comparative Example | | | | | | |
|---|---|---|---|---|---|---|---|---|---|---|---|---|---|---|---|---|
|  |  | 26 | 27 | 28 | 29 | 30 | 31 | 32 | 33 | 4 | 5 | 6 | 7 | 8 | 9 | 10 |
| Polyester |  | e | f | g | E | F | G | H | E | f | f | g | E | F | G | H |
| Reactive compound R |  | 10 | 10 | 10 | 10 | 10 | 10 | 10 | 10 |  |  |  |  |  |  |  |
| Stabilizer II |  | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Additive IV |  |  |  |  |  |  |  |  | 0.1 |  |  |  |  |  |  |  |
| Evaluation | Melt strength (sec.) | 25 | 21 | 25 | 22 | 19 | 24 | 23 | 25 | 11 | 11 | 10 | 9 | 10 | 8 | 9 |
|  | Drawing state and product accuracy | A | A | A | A | A | A | A | A | B | B | B | B | B | B | B |
|  | Transparency | — | — | — | 4 | 4 | 5 | 4 | 4 | — | — | — | 4 | 4 | 5 | 4 |

TABLE 6

| | | Synthetic Examples | | | | | | | | | |
|---|---|---|---|---|---|---|---|---|---|---|---|
| | | e | f | g | E | F | G | H | I | h | i |
| Acid | Terephthalic acid | 63 | 65 | 68 | 100 | 88 | 90 | 100 | 99.85 | 99.84 | |
| | Isophthalic acid | 10 | | 32 | | | 10 | | | | |
| | Naphthalenedicarboxylic acid | | | | | | | | | | 100 |
| | Adipic acid | 27 | 35 | | | 12 | | | | | |
| | Trimellitic anhydride | | | | | | | | 0.15 | 0.16 | |
| Alcohol | Ethylene glycol | | 35 | | 80 | 78 | 72 | 71 | 67.7 | 90.8 | 97.5 |
| | Neopentyl glycol | | | | 20 | | | | | | |
| | 2-Methyl-1,3-propanediol | | | | | 22 | | | | | |
| | 1,3-Propanediol | | | | | | 28 | | | | |
| | Cyclohexanedimethanol | | | | | | | 29 | 31 | 6.8 | |
| | Diethylene glycol | | | | | | | | 1 | 2.4 | 2.4 |
| | 1,4-Butanediol | 100 | 64 | 93 | | | | | | | |
| | Trimethylolpropane | | | | | | | | | | 0.1 |
| | Polytetramethylene glycol (MW 1,000) | | 1 | 7 | | | | | | | |
| Physical properties | Reduced viscosity (dl/g) | 0.80 | 0.84 | 0.75 | 0.81 | 0.72 | 0.70 | 0.85 | 0.81 | 1.4 | 1.4 |
| | Glass transition temp. (° C.) | −6 | −9 | −32 | 78 | 55 | 58 | 78 | 78 | 79 | 122 |
| | Melting point (° C.) | 160 | 135 | 142 | — | — | — | — | — | 232 | 270 |
| | Acid value (eq./10$^6$ g) | 28 | 30 | 32 | 30 | 16 | 38 | 25 | 25 | 15 | 12 |

Example 34

Polyester (e) (100 parts by weight), reactive compound (R) (10 parts by weight) and bis[S-(4-tert-butyl-3-hydroxy-2,6-dimethylbenzyl)]thioterephthalate (0.3 part by weight) as a stabilizer were mixed, and the resulting mixture was kneaded with an extruder (L/D=30, screw diameter=20 mm, a full flighted screw, compression ratio=2.0), which was set at a revolution rate of 30 rpm and a whole barrel temperature of 180° C. The resin composition had a reduced viscosity of 0.82 dl/g.

Then, the kneaded composition was molded with a profile extrusion molding apparatus consisting of a single-screw extruder (L/D=25, a full flighted screw, screw diameter=65 mm) which was equipped with a die lip for producing a molded article shown in FIG. 1, and the drawing state and accuracy of the molded article, and the surface smoothness were evaluated. The reduced viscosity after molding was 0.87 dl/g.

The drawing state and accuracy of the article were evaluated in the same manner as those in Examples 26–33, and the surface smoothness was evaluated as follows:

The roughened state of the outer surface of the molded article was measured with an ultra deep surface contour measuring microscope (VK-8500 manufactured by KEYENCE) and evaluated according to the following criteria:

A: Maximum height of a roughened surface being less than 100 μm.
B: Maximum height of a roughened surface being from 100 μm to less than 200 μm.
C: Maximum height of a roughened surface being 200 μm or larger.

The results are shown in Tables 7 and 8 together with the melt strength of the resins.

Examples 35–41 and Comparative Examples 11–20

Profile extrusion molding was carried out in the same manner as in Example 34 except that the materials shown in Tables 7 and 8 were used and the molding was carried out under the conditions shown in Tables 7 and 8. In Examples and Comparative Examples in which amorphous polyester (E) to (I) were used, the whitening on bending was also evaluated with an eye. Whitening was not or hardly observed in the Examples, and the molded articles had no problem.

Stabilizer X shown in Tables 7 and 8 was bis[S-(4-tert-butyl-3-hydroxy-2,6-dimethylbenzyl)]thioterephthalate, and additive IV was the compound shown in Table 2.

TABLE 7

| | | Examples | | | | | | | | |
|---|---|---|---|---|---|---|---|---|---|---|
| | | 34 | 35 | 36 | 37 | 38 | 39 | 40 | 41 | 42 |
| | Polyester resin | e | f | g | E | E | F | G | H | F |
| | Reactive compound R | 10 | 10 | 10 | 10 | 5 | 10 | 10 | 10 | 10 |
| | Stabilizer X | 0.3 | 0.3 | 0.3 | 0.3 | 0.3 | 0.3 | 0.3 | 0.3 | 0.3 |
| | Additive IV | | | | | | | | | 0.1 |
| | Reduced viscosity before molding | 0.80 | 0.84 | 0.75 | 0.81 | 0.84 | 0.72 | 0.70 | 1.1 | 1.1 |
| Sagging evaluation | Melt strength (sec.) | 25 | 27 | 25 | 29 | 30 | 26 | 24 | 29 | 25 |
| Profile extrusion molding conditions | Cylinder temp. (° C.) | 210 | 220 | 220 | 210 | 210 | 230 | 220 | 230 | 230 |
| | Die temp. (° C.) | 200 | 210 | 210 | 200 | 200 | 220 | 210 | 220 | 220 |
| | Screw rev. rate (rpm) | 200 | 250 | 300 | 250 | 200 | 350 | 250 | 280 | 280 |
| | Resin temp. (° C.) | 222 | 231 | 235 | 232 | 218 | 242 | 234 | 236 | 238 |
| Evaluation | Drawing state and | A | A | A | A | A | A | A | A | A |

TABLE 7-continued

|  |  | Examples |  |  |  |  |  |  |  |  |
|---|---|---|---|---|---|---|---|---|---|---|
|  |  | 34 | 35 | 36 | 37 | 38 | 39 | 40 | 41 | 42 |
| of profile extrusion molding | product accuracy | | | | | | | | | |
| | Transparency | — | — | — | 4 | 4 | 4 | 5 | 4 | 4 |
| | Surface smoothness | A | A | A | A | A | A | A | A | A |
| Reduced viscosity after molding | | 0.87 | 0.97 | 2.00 | 0.73 | 0.97 | 1.44 | 0.85 | 1.5 | 1.6 |
| (Reduced viscosity after molding)/ (reduced viscosity before molding) | | 1.06 | 1.20 | 1.50 | 1.20 | 1.15 | 2.00 | 1.21 | 1.36 | 1.45 |

TABLE 8

|  |  | Comparative Example |  |  |  |  |  |  |  |  |  |
|---|---|---|---|---|---|---|---|---|---|---|---|
|  |  | 11 | 12 | 13 | 14 | 15 | 16 | 17 | 18 | 19 | 20 |
| Polyester resin | | e | f | g | E | F | G | H | I | h | i |
| Reactive compound R | | | | | | | | | | | |
| Stabilizer X | | 0.1 | 0.1 | 0.1 | 0.1 | 0.1 | 0.1 | 0.1 | | | |
| Additive IV | | | | | | | | | | | |
| Reduced viscosity before molding | | 0.80 | 0.84 | 0.75 | 0.81 | 0.60 | 0.75 | 0.68 | 0.81 | 1.4 | 1.4 |
| Sagging evaluation | Melt strength (sec.) | 11 | 11 | 10 | 9 | 10 | 8 | 9 | 17 | *1 | *1 |
| Profile extrusion molding conditions | Cylinder temp. (° C.) | 200 | 200 | 200 | 200 | 200 | 200 | 200 | 220 | 275 | 290 |
| | Die temp. (° C.) | 190 | 190 | 190 | 190 | 190 | 190 | 190 | 210 | 265 | 280 |
| | Screw rev. rate (rpm) | 200 | 200 | 200 | 200 | 200 | 200 | 200 | 200 | 200 | 200 |
| | Resin temp. (° C.) | 210 | 210 | 210 | 210 | 210 | 210 | 210 | 230 | 284 | 297 |
| Evaluation of profile extrusion molding | Drawing state and product accuracy | B | B | B | B | B | B | B | B | A | A |
| | Transparency | — | — | — | 4 | 4 | 5 | 4 | 5 | 4 | 3 |
| | Surface smoothness | C | C | C | C | C | C | C | C | B | B |
| Reduced viscosity after molding | | 0.74 | 0.71 | 0.65 | 0.72 | 0.55 | 0.70 | 0.62 | 0.72 | 1.20 | 1.10 |
| (Reduced viscosity after molding)/ (reduced viscosity before molding) | | 0.93 | 0.85 | 0.87 | 0.89 | 0.92 | 0.93 | 0.91 | 0.89 | 0.86 | 0.79 |

Note: *1 Because of the high melting point of the resins, the sagging test (200° C. less) could not be carried out.

The sagging, which is reported in terms of "melt strength (sec.)" in Tables 7 and 8, was evaluated as follows:

Using an extruder (L/D=30, screw diameter=20 mm, full-flighted screw, compression ratio=2.0, distance from a die orifice to a ground surface=1 m) equipped with ASTM Extrusion Die No. 1 Garvey Type, which is set at a revolution rate of 100 rpm and a whole barrel temperature of 200° C., a resin composition is extruded in a horizontal direction at a discharge rate of 48 g/min, and a time from the start of discharging of the polymer to touching of the resin composition to the ground surface is measured. The longer time means a higher melt strength, since the polymer is not thinned by its own weight.

The transparency reported in Tables 7 and 8 was evaluated in the same manner as in the case of Table 2. The transparency was evaluated only in Examples 37–42 and Comparative Examples 14–20 in which amorphous polyesters (E) to (H) were used.

As can be seen from the results of Tables 7 and 8, in Examples 34–42, since the sagging of the resin was small during molding, the drawing state in the profile extrusion molding process and the dimensional accuracy of the molded articles were good, and the articles had excellent transparency and surface smoothness.

Comparative Examples 11–20 were outside the scope of the present invention, since the ratio of a reduced viscosity of a resin after molding to that before molding was not in the range of 1.01 to 3.00. In Comparative Example 19, the polyester was copolymerized with trimellitic anhydride to branch the polymer chains, but the sagging was not suppressed and thus the drawing state in the profile extrusion molding process and the dimensional accuracy of the molded articles were not good. In Comparative Examples 19 and 20, the resin had a high reduced viscosity before molding and thus the sagging was improved and the profile extrusion shapability was suppressed. However, the molding temperature should have been elevated to achieve the melt viscosity suitable for molding. As a result, the resin had the low reduced viscosity after molding and the transparency deteriorated, presumably because the resin might have been decomposed. In addition, the surface of the molded article was roughened due to the melt properties of the resin just after molding, and thus the surface smoothness deteriorated.

What is claimed is:

1. A polyester resin composition for profile extrusion molding comprising an amorphous polyester resin, and a reactive compound having a weight average molecular weight of 1000 to 500,000, wherein said polyester resin has an acid value of 100 eq./$10^6$ grams or less, and comprises an acid component containing at least 50% by mole of an aromatic dicarboxylic acid having 8 to 14 carbon atoms, and an alcohol component containing at least 50% by mole of at least one glycol selected from the group consisting of ethylene glycol, diethylene glycol, neopentyl glycol, cyclohexanedimethanol, 1,3-propanediol and 2-methyl-1,3-propandiol, and wherein said reactive compound has at least two glycidyl groups per molecule.

2. The polyester resin composition for profile extrusion molding according to claim 1 wherein an amount of said reactive compound is from 0.1 to 20% by weight per 100 parts of said polyester.

3. The polyester resin composition for profile extrusion molding according to claim 1 wherein said aromatic dicarboxylic acid having 8 to 14 carbon atoms is at least one carboxylic acid selected from the group consisting of terephthalic acid and isophthalic acid.

4. A profile shape obtained by profile extrusion molding a polyester resin composition according to claim 1.

* * * * *